United States Patent [19]

Kalka et al.

[11] 4,207,412

[45] Jun. 10, 1980

[54] AFTERTREATMENT OF SPRAY DRIED, POWDERED VINYL CHLORIDE EMULSION POLYMERIZATES

[75] Inventors: Josef Kalka, Herten; Hermann Winter, Marl, both of Fed. Rep. of Germany

[73] Assignee: Chemische Werke Huels Aktiengesellschaft, Marl, Fed. Rep. of Germany

[21] Appl. No.: 722,400

[22] Filed: Sep. 13, 1976

[30] Foreign Application Priority Data

Sep. 13, 1975 [DE]  Fed. Rep. of Germany ....... 2541013

[51] Int. Cl.$^2$ ................................................ C08F 6/14
[52] U.S. Cl. .................................... 528/499; 526/91; 526/216; 528/502; 528/503
[58] Field of Search ............................. 528/499, 502; 526/344.2

[56] References Cited

U.S. PATENT DOCUMENTS

| | | | |
|---|---|---|---|
| 2,829,134 | 4/1958 | De Coene | 526/216 |
| 2,957,858 | 10/1960 | O'Donnell | 526/216 |
| 3,311,579 | 3/1967 | Donat | 526/213 X |
| 3,627,717 | 12/1971 | Kuhnen | 260/23 EM |
| 3,652,752 | 3/1972 | Rosenthal | 260/879 |
| 3,732,178 | 5/1973 | Kuhnen | 260/23 EM |
| 3,805,869 | 4/1974 | Winter | 159/4 B |
| 3,883,494 | 5/1975 | Winter | 526/344 X |

FOREIGN PATENT DOCUMENTS

| | | | |
|---|---|---|---|
| 42-17644 | 9/1967 | Japan | 528/499 |
| 43-29662 | 12/1968 | Japan | 528/499 |

*Primary Examiner*—C. A. Henderson
*Attorney, Agent, or Firm*—Millen & White

[57] ABSTRACT

The rheological properties of plastisols of powdered polymerizates produced by polymerizing vinyl chloride or a mixture of vinyl chloride and a copolymerizable monomer in an aqueous emulsion in the presence of a water-soluble catalyst and an alkali salt of a fatty acid as the polymerization emulsifier and spray drying the resultant polymerizate, are improved by treating the powdered polymerizate with water in a weight ratio of from 1:2 to 1:15 and then drying.

1 Claim, No Drawings

AFTERTREATMENT OF SPRAY DRIED, POWDERED VINYL CHLORIDE EMULSION POLYMERIZATES

BACKGROUND OF THE INVENTION

This invention relates to a process for improving the rheological properties of spray dried, powdered vinyl chloride emulsion polymerizates.

It is known that polymers of vinyl chloride suitable for forming into pastes (plastisols) can be produced by emulsion polymerization employing an alkali salt of fatty acid as polymerization emulsifier, by conducting the polymerization in an alkaline medium, since alkali salts of fatty acids, which have pH values of at least 9.5 in an aqueous medium, are fully effective as emulsifiers only at such alkaline pH values.

By the polymerization in the presence of an alkali salt of a fatty acid as the emulsifier, polymers are obtained having a considerably improved thermal stability, compared to those polymers obtained by the polymerization in the presence of other conventional emulsifiers, such as alkyl sulfates, alkyl and alkylaryl sulfonates (see Table 1). The polymers produced with alkali metal salts of fatty acids, however, form plastisols of unsatisfactorily high viscosities. (See Comparative Examples 1 and 2).

In accordance with a prior process, plastisols of very low viscosities can be obtained from polymers of vinyl chloride produced by emulsion polymerizations employing alkaline salts of carboxylic acids as emulsifiers by reducing the pH of the polymer dispersion to pH values of 4 to 7.5 immediately before or during the spray drying step. The polymerization is conducted at a pH of 9.5–11.5, so that the resultant dispersion remains mechanically stable. See U.S. Pat. No. 4,133,947, whose disclosure is incorporated by reference.

It is an object of this invention to provide a process for improving the rheological properties of vinyl chloride polymers, prepared by emulsion polymerization employing an alkali salt of a fatty acid as the polymerization emulsifier which does not require a pH adjustment step prior to or during spray drying of the polymerizate. Other objects will be apparent to those skilled in the art.

SUMMARY OF THE INVENTION

In a process aspect, this invention relates to a process for improving the rheological properties of powdered polymerizates formable into plastisols, produced by polymerizing vinyl chloride or a mixture of vinyl chloride and a copolymerizable monomer in an aqueous emulsion in the presence of a water-soluble catalyst and an alkali metal salt of a fatty acid as the polymerization emulsifier and spray drying the resultant polymerizate, which comprises treating the powdered polymerizate with water in a weight ratio of powder to water of from 1:2 to 1:15 and then drying the water-treated powder.

DETAILED DISCUSSION

Preferably, the spray-dried powder is treated with water in a weight ratio of 1:3 to 1:10. The duration of the treatment is preferably about 10–30 minutes. Longer times have no advantage. It is advantageous to employ the water at a temperature of about 15°–50° C., preferably about ambient temperature, e.g., about 20° C.

The treatment of the spray dried powder with water can be effected by mixing the powder and the water in a container equipped with an agitator, and then agitating the mixture for about 10–30 minutes. Subsequently, the water can be separated in a convenient manner, e.g., by centrifugation or by filtration.

The moist powder is then dried, e.g., at a temperature of about 40°–70° C. Dryers of the usual type of construction, e.g., drum dryers, can be employed.

It will be apparent that if an excess of alkali was utilized in the polymerization, i.e., in addition to that provided by the alkaline salt of the fatty acid employed as emulsifier, to increase the stability of the resultant dispersion, the amount of water employed should be correspondingly increased. Although it is possible to use larger amounts of water than a 1:15 ratio, no advantage results from doing so.

The process of this invention can be employed for the preparation of plastisol-forming powdered vinyl chloride homopolymers and copolymers. Suitable comonomers are all monomers copolymerizable with vinyl chloride but preferably are those having the group —CH═C<, such as vinylidene chloride, vinyl esters of carboxylic acids, such as vinyl acetate, vinyl formate, acrylic esters, as well as unsaturated dicarboxylic acids, such as maleic acid and fumaric acid, The comonomers can be present in the polymerization charge to an extent of up to 30% by weight of the mixture of monomers.

Examples of suitable catalysts are the water-soluble compounds conventionally employed in emulsion polymerizations of vinyl chloride, e.g., water-soluble persulfates, water-soluble persulfates in combination with a reducing component, e.g., a water-soluble bisulfite, hydrosulfite, hydrazine or thiosulfate, formaldehyde sulfoxylates, hydrogen peroxide in combination with a reducing agent, e.g., bisulfite, hydrazine, hydroxylamine or ascorbic acid, as well as water-soluble persulfates in combination with hydrogen peroxide and an activating agent, e.g., copper salts which are employed in an alkaline medium with a complexing agent, e.g., a pyrophosphate.

Examples of suitable emulsifiers are Na and K salts of straight chain and branched fatty acids of 8–18 carbon atoms, e.g., sodium or potassium caprate, sodium or potassium laurate, sodium or potassium myristate, sodium or potassium plamitate, sodium or potassium stearate. Sodium laurate and sodium myristate are preferred.

The dispersions (latices) obtained after the polymerization ordinarily should contain no more than 1.0% by weight of emulsifier when the polymerization is conducted batchwise and no more than 2% when the polymerization is continuous, since high emulsifier concentrations have an adverse effect in the final products and during processing, e.g., they lower the transparency and elevate the water sensitivity, as well as the electrical values of the polymers and the articles manufactured therefrom.

The polymers also should be produced as high solids content emulsions, viz., those containing at least 45% by weight of monomers, in order to meet the requirements for economy required for a modern technical process. High monomer concentrations ensure acceptably high space-time yields in the polymerization reactor and in the spray-drying tower and also reduce the energy requirements of the spray-drying step.

A batchwise mode of operation which provides the manufacture of especially high-percentage, low-emulsifier polymer dispersons, is described in Fed. Rep. of Germany Application DAS 1,964,029, according to which the emulsifier is introduced during the polymerization procedure in accordance with a specific program.

The polymerization can be conducted at the usual temperatures, viz., from about 35° to 70° C., and pressures, e.g., about 5.5 bars to 13 bars.

The spray-drying step can be conducted in conventional spray-drying devices. Such equipment is described, for example, in "Ullmanns Encyclopaedie der Technischen Chemie" (1951) 1:602 et seq. A particularly suitable process for the spray drying of vinyl chloride polymer dispersions, leading to powders having initially the particle size suitable for pastes, is described in U.S. Pat. No. 3,805,869.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

COMPARATIVE EXAMPLE 1

With the exclusion of atmospheric oxygen, 2,200 liters of demineralized water is charged into a 6 m³ pressure vessel, along with a previously prepared solution of 60 g. of copper nitrate as the redox component and 1,440 g. of sodium pyrophosphate as the complexing agent for the copper nitrate in 5,000 g. of water. The batch is adjusted to pH 11.0. The reactor vessel is heated to about 56° C. and, under agitation, 700 kg. of vinyl chloride and 20.1 of activator solution (3% solution of $K_2S_2O_2$ in water) are added thereto. After onset of the polymerization, an emulsifier solution (3.5% solution of sodium laurate in water with an excess of 0.15 equivalents of NaOH, based on the lauric acid), vinyl chloride, and a 1.5% hydrogen peroxide solution are added in accordance with the following program:

| Hour | Emulsifier liter | Vinyl Chloride kg. | Hydrogen Peroxide liter | Conversion % |
|---|---|---|---|---|
| 0.75 | 3 | 500 | 5 | 5.5 |
| 1.5 | 6 | 500 | 5 | 10.5 |
| 2.25 | 11 | 500 | 5 | 28.2 |
| 3.0 | 48 | 500 | 5 | 40.7 |
| 3.75 | 134 | | | 53.5 |
| 4.5 | 230 | | | 62.0 |
| 5.25 | 96 | | | 67.5 |

The polymerization is terminated after about 6–7 hours, thus obtaining a latex having a dry solids content of 48%. The K-value is 70 (K-value method by Fikentscher: Lunge-Berl [1934/5]:945); the final pH is 11.0, and the surface tension is 48 dyn/cm. The emulsifier content is 0.75% by weight.

The thus-obtained dispersion is spray-dried in accordance with U.S. Pat. No. 3,805,869. A paste is formed from 60 parts by weight of the powder with 40 parts by weight of dioctyl phthalate, and the viscosity of the paste is measured after two hours employing a Haake rotary viscometer. Table 2 shows the viscosities for several shear velocities.

COMPARATIVE EXAMPLE 2

An autoclave having a capacity of 300 liters, equipped with a jacket cooler and a vane-type agitator, is charged per hour with the following:
 14 liters of vinyl chloride
 11.6 liters of an aqueous 2.0% sodium laurate solution
 0.2 liters of 3% aqueous potassium persulfate solution
 0.2 liters of a 0.5% aqueous hydrogen peroxide solution The autoclave is filled to an extent of 90%. The polymerization temperature is maintained at 46° C. Monomer conversion is approximately 90%. A dispersion is continuously withdrawn from the bottom of the container with a solids content of 49%, a pH of 9.5, a K-value of 70, and a surface tension of 37.4 dyn/cm.

The dispersion is spray-dried as described in Comparative Example 1. Table 2 gives the paste viscosity of the powder, prepared into a paste in a weight ratio of 60:40 with dioctyl phthalate.

EXAMPLE 1

One kilogram of a powder prepared in accordance with Comparative Example 1 is combined in a 10-liter vessel with 3 kg. of water having a temperature of 20° C., and the mixture is agitated for 15 minutes with a vane-type agitator at 500 r.p.m. After the water has been removed by suction, a filter cake is obtained having a moisture content of 25–30%; this filter cake is dried in a dryer for 12 hours at 40° C. The thus-obtained dry powder is made into a paste with dioctyl phthalate at a ratio of 60:40. Table 2 contains the paste viscosity.

EXAMPLE 2

The procedure of Example 1 is followed, except that 6 kg. of water is utilized for the agitating step. The paste viscosity of the powder is indicated in Table 2.

EXAMPLE 3

The procedure of Example 1 is utilized, except that 10 kg. of water is used for the agitating step. Table 2 indicates the paste viscosity of the powder.

EXAMPLE 4

One kilogram of a powder prepared in accordance with Comparative Example 2 is agitated with 3 kg. of water as set forth in Example 1, vacuum-filtered and dried. The paste viscosity of the powder can be derived from Table 2.

EXAMPLE 5

The method of Example 4 is followed, but 1 kg. of the spray-dried powder is mixed with 10 kg. of water. The paste viscosity of the thus-obtained, dry powder is given in Table 2.

Test for Thermostability

The synthetic resin powder to be tested is mixed in a porcelain dish with plasticizer and stabilizer in the following ratio:
 100 parts by weight of polyvinyl chloride
 30 parts by weight of dioctyl phthalate
 1 part by weight of Ba-Cd stabilizer ("ZPS-7", Baerlocher Co.)

The mixture is rolled in a rolling mill for 5 minutes and then drawn into a sheet having a thickness of 1.0 mm. Squares (18×18 mm.) are punched out from this sheet and subjected to a temperature load of 180° C. in a revolving Brabender heating furnace. Samples are withdrawn at intervals of 5 minutes. The thermal load can be determined from the discoloration. The time elapsed up to directly prior to the sample turning black is a measure of the thermostability thereof.

Table 1 gives the thermostabilities of polymers obtained in polymerizations conducted under otherwise identical conditions employing various emulsifiers.

TABLE 1

| Emulsifier 0.75% | Alkyl Sulfate | Alkylaryl Sulfonate | Sodium Laurate |
| --- | --- | --- | --- |
| Thermal Stability (Minutes) | 20 | 25 | 70 |

As can be seen from Table 1, polymers having a considerably higher thermostability are produced when alkali salts of fatty acids are employed as emulsifiers.

TABLE 2

| | Paste Viscosity* (poises) at Shear Velocities (sec$^{-1}$) of | | |
| --- | --- | --- | --- |
| | 0.3 | 1.0 | 100 |
| Comp. Example 1 | 12,000 | 4,000 | 100 |
| Comp. Example 2 | 12,000 | 4,000 | 100 |
| Example 1 | 3,000 | 1,000 | 100 |
| Example 2 | 1,000 | 600 | 80 |
| Example 3 | 350 | 220 | 80 |
| Example 4 | 80 | 80 | 150 |

TABLE 2-continued

| | Paste Viscosity* (poises) at Shear Velocities (sec$^{-1}$) of | | |
| --- | --- | --- | --- |
| | 0.3 | 1.0 | 100 |
| Example 5 | 100 | 100 | 150 |

*60:40 weight ratio of powder:dioctyl phthalate

As demonstrated by the results given in Table 2, the viscosities of the pastes obtained from the spray-dried powdered polymerizates can be improved by 1–2 orders of magnitude by the process of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for improving the rheological properties of powdered polymerizates formable into plastisols, produced by polymerizing vinyl chloride or a mixture of vinyl chloride and a copolymerizable monomer in an aqueous emulsion in the presence of a water-soluble catalyst and an alkali salt of a fatty acid as the polymerization emulsifier and spray drying the resultant polymerizate, which comprises treating the powdered polymerizate for about 10–30 minutes with water in a weight ratio of powder to water of from 1:3 to 1:10 and then drying the water-treated powder, wherein the powdered polymerizate is treated with water for about 10–30 minutes at a temperature of about 15°–50° C.

* * * * *